United States Patent
Yang et al.

(10) Patent No.: US 6,324,210 B1
(45) Date of Patent: Nov. 27, 2001

(54) SLIDING MATCHED FILTER WITH FLEXIBLE HARDWARE COMPLEXITY

(75) Inventors: Gang Yang, Eatontown; Don Li, Morganville, both of NJ (US)

(73) Assignee: Golden Bridge Technology Incorporated, West Long Beach, NJ (US)

(*) Notice: Subject to any disclaimer, the term of this patent is extended or adjusted under 35 U.S.C. 154(b) by 0 days.

(21) Appl. No.: 09/668,743

(22) Filed: Sep. 25, 2000

Related U.S. Application Data

(60) Provisional application No. 60/172,150, filed on Dec. 17, 1999, and provisional application No. 60/185,370, filed on Feb. 28, 2000.

(51) Int. Cl.[7] .................................................. H04B 1/707
(52) U.S. Cl. ........................ 375/152; 375/148; 375/150
(58) Field of Search .................................. 375/143, 144, 375/148, 152, 142, 150, 343

(56) References Cited

U.S. PATENT DOCUMENTS

| | | | |
|---|---|---|---|
| 4,933,952 | * 6/1990 | Albrieux et al. | 375/206 |
| 5,022,046 | * 6/1991 | Morrow, Jr. | 375/130 |
| 5,577,022 | 11/1996 | Padovani et al. | |
| 5,627,855 | 5/1997 | Davidovici | |
| 5,729,571 | * 3/1998 | Park et al. | 375/206 |
| 5,917,829 | * 6/1999 | Hertz et al. | 370/479 |
| 6,038,250 | * 3/2000 | Shou et al. | 375/206 |

OTHER PUBLICATIONS

"An Introduction to Fourth Generation (4G) Cellular Technology," *GBT Technology & Innovation*, by Kourosh Parsa, Dec. 3, 1999, pp. 1–19.

"7 Requirements For Base Station CDMA Operation," *TIA/EIA/IS–95–A.*, pp. 7–1, 7–2 and 7–21 to 24.

"Forward CDMA Channel Structure (Part 1 of 2 and Part 2 of 2)," pp. 7–3, 7–4, 7–26 and 7–27, *ANSI/TIA/EIA–95–B*.

"cdma2000 System Description," Vo.18, Jul. 27, 1998, pp. 56, 70 and 84.

* cited by examiner

*Primary Examiner*—Don N. Vo
(74) *Attorney, Agent, or Firm*—McDermott, Will & Emery

(57) ABSTRACT

Multi-path effects are common in mobile communications. When coupled with spread-spectrum signals utilizing spreading code sequences, detection of more than one multi-path signal becomes a necessity in order to output a clean signal with little loss. In accord with the invention, a spread-spectrum sliding matched-filter searcher system comprises a partial matched-filter that receives the input spread-spectrum signal. The searcher matches samples of the input signal with a tap length m of the reference code and produces a first correlation value. The first correlation value is compared to a first threshold. When it equals or exceeds the first threshold, the first correlation value is integrated to produce a second correlation value. This second value is compared with a second threshold, which if met signifies the detection of the multi-path signal. The process is repeated until all significant multi-path signals are detected. This design of the present invention is flexible in nature because the searcher can be programmed to act like a matched-filter, a correlator, or a combination of both while significantly improving the search time and reducing the amount of hardware and complexity characteristic of a matched-filter.

18 Claims, 6 Drawing Sheets

SLIDING MATCHED FILTER WITH FLEXIBLE HARDWARE COMPLEXITY

RELATED APPLICATION

This application claims the benefit of U.S. Provisional Application No. 60/172,150, entitled "SLIDING MATCHED FILTER WITH FLEXIBLE HARDWARE COMPLEXITY" filed on Dec. 17, 1999, and U.S. Provisional Application No. 60/185,370, entitled "METHOD AND APPARATUS FOR MULTIPATH SEARCHER" filed on Feb. 28, 2000, the disclosure of which is entirely incorporated herein by reference.

FIELD OF THE INVENTION

The concepts involved in the present invention relate to the detection of PN phases of spread-spectrum signals.

BACKGROUND

Mobile communication is becoming increasingly popular. The recent revolution in digital processing has enabled a rapid migration of mobile wireless services from analog communications to digital communications.

Spread-spectrum is a method of modulation, like FM, that spreads a data signal for transmission over a bandwidth, which substantially exceeds the data transfer rate. Direct sequence spread-spectrum involves modulating a data signal onto a pseudo-random (PN) chip sequence. The chip sequence is the spreading code sequence, for spreading the data over a broad band of the spectrum. The spread-spectrum signal transmits as a radio wave over a communications media to the receiver. The receiver despreads the signal to recover the information data.

The attractive properties of these systems include resistance to multipath fading, soft standoffs between base stations and jam resistance. Additionally, in a multipath environment, the use of Rake receivers enables the harnessing of the total received energy.

Receiving the direct sequence spread-spectrum communications requires detection of one or more spreading chip-code sequences embedded in an incoming spread-spectrum signal as well as subsequent synchronization of the receiver to the detected chip-code sequence. Initial detection and phase synchronization of the spreading chip-code sequence(s) in the receiver is commonly known as code acquisition.

On the transmission side of a spread-spectrum transmitter, a pseudo random noise (PN) generator spreads the data to be transmitted. Once spread, the transmitted signal has a bandwidth that is larger than that of the data. In essence, the data is spread over a large bandwidth in the spectral domain. Once transmitted, the signal may travel over numerous paths from the transmitter to the receiver. Therefore, the receiver receives multiple signals that traveled over different paths thereby requiring the receiver to decipher the signal of each path. Furthermore, the spreading code of the multi-path signal will not be identical to the actual transmitted PN sequence due to the multi-path environment. Correlators and matched-filters are commonly used to acquire each multi-path signal.

FIG. 6 is a block diagram useful in understanding the implementation of correlators in a spread-spectrum receiver. The correlator of FIG. 6 utilizes a local PN sequence generator 602 which generates a PN sequence, also referred to as the reference code, that is the same PN sequence used as the spreading code in the transmitter. Essentially, one input of a multiplier 601 receives an input signal, as an example, a pilot signal spread by a known PN sequence. Coupled to the other input of the multiplier 601 is the local PN sequence generator 602. Therefore, the correlator first multiplies the input signal 101 with the reference code generated by the local PN sequence generator 602.

The input of an integrator 603 receives the product signal output of the multiplier 601. The product signal is integrated, over a predetermined number of N chips. N is usually equal to the PN sequence length. The integration of the signal over N chips produces a correlation value. This correlation value represents the comparison of the reference code to the sequence code of the input signal 101. High correlation values represent a close match of one multi-path signal. On the other hand, a low correlation value represents a low probability of a match.

The output of the integrator 603 goes to a decision circuit 606 comprising a threshold comparator 604 and a DSP 605. The decision circuit 606 compares the correlation value at the output of the integrator 603 to the threshold $\tau$. The threshold $\tau$ is set to a value depending on the desired probability of detecting a signal.

The DSP 605 also connects to the local PN sequence generator 602 and to each of several tracking fingers 607, where each finger 607 tracks a multipath signal. When the correlation value does not equal or exceed the threshold $\tau$, the DSP 605 sends a control signal to the local PN sequence generator 602 instructing it to advance or retard the reference code by either a half-chip or a predetermined number of chips with respect to the input signal 101. The length of the advance or retard depends on the resolution or accuracy of detection desired. Once advanced or retarded, the multiplier 601 and the integrator 603 correlate the new reference code with the input signal 101 to produce a new correlation value. This procedure repeats until the correlation value equals or exceeds the threshold $\tau$.

Each finger 607 connects to the local PN sequence generator 602 and the input signal 101 and is controlled by the DSP 605. Therefore, once the correlation value equals or exceeds the threshold $\tau$, the DSP 605 sends a control signal to the local PN sequence generator 602 instructing it to download the reference code to one of the fingers 607. The DSP 605 also sends a signal to one of the fingers 607 instructing it to receive the reference code sent by the local PN sequence generator 602. Once a finger 607 receives a reference code, it then starts to correlate the input signal 101 with the downloaded reference code signal to track the respective multipath signal.

After which, the procedure of advancing or retarding the reference code producing a new correlation value repeats as discussed above. Each time a new correlation value equals or exceeds the threshold $\tau$ represents detection of another multi-path signal. The procedure of downloading the reference code to one of the plurality of fingers 607 also repeats for each detected multi-path signal. The output of each finger is connected to the Rake combiner. The Rake combiner 608 combines each detected multipath signal, producing a combined signal 113 with low distortion and little energy loss.

This correlation technique takes a considerable amount of time. To reduce the search time, as an example, U.S. Pat. No. 5,577,022 teaches limiting the integration length to a set number of chips or an equivalent data symbol length in the forward link of an IS-95 system. With this approach, each hypothetical pilot code is correlated with the received pilot signal over a selected number of chips (e.g., 64 chips) of a PN sequence, and the results of the correlation are integrated over the same time interval to obtain a signal energy value. The result is compared to a predefined threshold. If the result is less than the threshold, the value of received signal energy associated with the hypothetical code is set to zero. If the value for one hypothetical code is set to zero, the search moves on to the next code and repeats the operations of correlating and integrating to determine the energy associated with the next hypothetical code. These operations continue until a determination is made as to the signal energy level associated with each hypothetical code in a candidate set.

As shown by this discussion, if a receiver uses only one correlator, the receiver must advance or retard and repeat the process, sequentially, to find the spreading code sequence. Repetition multiplies the delay by the number of signals that the receiver must try to find. One way to speed up this code acquisition is to use many correlators working in parallel. Some receivers use as many as 30 correlators, reducing the search time by a factor of 30. However, the amount of hardware required also increases. Potentially, it requires as many as 30 integrators and 30 comparators.

Even though simple correlators have been used in the code acquisition for reception of spread-spectrum signals, faster and more efficient techniques for code acquisition rely on matched filters. For example, U.S. Pat. No. 5,627,855 discloses a spread-spectrum matched-filter including a code generator, a programmable-matched filter, a frame-matched filter, and a controller. One object of this patented approach was to reduce cost and circuit complexity, reduce volume required, and improve the performance. Specifically, this patent provides for frame matched-filters embodied in an in-phase-frame-matched-filter and a quadrature-phase-frame matched-filter. Programmable matched filters are coupled to the outputs of the frame-matched-filters embodied in an in-phase-programmable-matched filter and a quadrature-programmable-frame-matched-filter. Timing generators, code generators, processor, controllers, and demodulators are also coupled to the filters. The patented design does reduce cost and complexity of the hardware but only with respect to conventional matched-filtering techniques. Still, the hardware required is substantial.

However, a need still exists for a technique faster than a correlator but less complex than a true matched-filter for analyzing correlation of received signals to reference codes, to identify the actual code set received. A need also exists for a hardware implementation that offers the rugged acquisition characteristic of matched-filters and the simplistic aspects of correlators.

SUMMARY OF THE INVENTION

Accordingly, a general objective of the invention is to achieve improved processing when finding a spreading code sequence in a multi-path signal.

Another object of the invention is to provide a searcher with sufficient flexibility to allow a system designer to implement the searcher in many different situations and environments.

Another object of the invention is to achieve fast, accurate spreading code detection while reducing hardware and complexity of the circuitry.

The inventive concepts alleviate the above noted problems and achieve the stated objectives by using a spread-spectrum partial matched-filter searcher system, for finding multi-path signals. Specifically, the inventive searcher system utilizes a partial matched-filter for receiving an input of a spread-spectrum signal. The partial matched-filter correlates the input signal with a short segment of a PN reference sequence. The number of chips covered by the partial matched-filter at any one time is relatively small, so as to require less hardware and low circuit complexity. A decision circuit compares the correlation value with a predetermined threshold.

Another inventive concept to alleviate the above-noted problems uses the partial matched-filter, as discussed above, in combination with an integrator forming a sliding matched-filter searcher system. The partial matched-filter outputs a first correlation value, as discussed above. However, a decision circuit compares the first correlation value with a first predetermined threshold. If met, an integrator integrates the first correlation value over a predetermined number of chips. The integrator produces a second correlation value, and the decision circuit compares the value to a second predetermined threshold. If met, the searcher identified a multi-path signal.

During the integration, the PN sequence generator runs at the same speed and in the same logical direction as the input signal. After a predetermined number of chips, however, the local PN reference sequence will be frozen, and the integration circuit will be reset to zero. The inventive searcher now becomes a matched filter again. If there was success finding a multi-path signal, the coefficients of the local PN reference will be sent to a Coefficient Update Circuit. Either with success or failure of finding a multi-path signal, the DSP will check the output of the matched filter to see if the correlation value is greater than or equal to the first threshold $\tau$ after a predetermined number of chips. This process is repeated until all the significant multi-path signals are found.

This aspect of the present invention provides several advantages over the prior art. One advantage relates to the searcher functioning as a simple correlator when the partial matched-filter is reduced to a multiplier; a true matched-filter when the tap length is made at its full value; or a hybrid system of a matched-filter and a correlator. By the searcher functioning as both a matched-filter and a correlator, the searcher realizes the benefits of both the matched-filter and the correlator.

Another advantage relates to having a short tap length of the partial matched-filter having a typical value of 16 to 64, which is less than that of the prior art. With the short tap length, the circuitry of the matched-filter is not as complex and yet still providing significantly faster correlation times. Partially matching the received multi-path signal with the local PN sequence code and then successively integrating the correlation value allows the searcher to realize the benefits of a larger tap length matched-filter without the added complexity of the prior art.

Even another advantage relates to the optimization of the first and the second threshold values. The first threshold value governs whether the searcher will function as a partial matched-filter. Therefore, the first threshold value may be set to allow the matched-filter to detect a multi-path signal with a certain level of probability. Once a multi-path signal has been partially detected, the integrator integrates the first correlation value until the second correlation value equals or exceeds the second threshold representing a detection of the respective multi-path signal with high probability. Accordingly, each threshold may be optimized to a desired specification, which may depend on a number of factors. This optimization enhances the flexibility of the searcher.

Another advantage relates to the tracking of each of the detected multi-path signal. Specifically, each time the second threshold is met, the local PN sequence generator downloads the reference code to one of the plurality of fingers. The finger correlates the input signal with the downloaded reference signal for fine-tuning. When the detection of all the significant multi-path signals occur, a Rake combiner receives the outputs of the plurality of fingers and combines each multi-path signal thereby limiting energy loss and signal distortion. Additional objects, advantages and novel features of the invention will be set forth in part in the description which follows, and in part will become apparent to those skilled in the art upon examination of the following and the accompanying drawings or may be learned by practice of the invention. The objects and advantages of the invention may be realized and attained by means of the instrumentalities and combinations particularly pointed out in the appended claims.

BRIEF DESCRIPTION OF THE DRAWINGS

The drawing figures depict preferred embodiments of the present invention by way of example, not by way of limitations. In the figures, like reference numerals refer to the same or similar elements.

DETAILED DESCRIPTION OF THE PRESENTLY PREFERRED EMBODIMENTS

The present invention presents novel systems and methods for detecting a received spread-spectrum signal. The present invention implements a programmable matched-filter searcher, for spread-spectrum communication systems. The design provides improved and flexible processing while reducing the hardware and complexity when compared with traditional searchers. The inventive search technique utilizes a partial matched-filter for matching samples of a spread-spectrum input signal to a portion of a locally generated pseudo random (PN) sequence.

A preferred embodiment implements a sliding programmable matched-filter searcher, for example, for pilot-assisted spread-spectrum communication systems. The preferred technique utilizes a matched-filter for matching samples of a spread-spectrum input signal to a sliding window of a locally generated pseudo random (PN) sequence. However, the partial matched-filter in combination with an integrator functions as a correlator after a first threshold is met, thereby realizing the benefits of both the matched-filter and the correlator.

A searcher in accord with the invention may be utilized in a CDMA type spread-spectrum communication system (second-generation wireless) or in the third and fourth generation spread-spectrum communication wireless systems. Fourth generation wireless technology includes Wideband CDMA of the highest performance at the lowest power consumption and manufacturing cost. Fourth generation systems will allow high data rates and variable packet size transmission, will be a IP backbone allowing voice over IP, and will allow for better handoffs. Fourth generation technology has the capability of merging cellular networks with other networks such as WANs, LANs, Paging/Cellular Networks, Television Networks, and Radio. Fourth generation will ultimately combine cellular networks with other networks thereby providing compatibility among all the networks and do so at a low cost.

Figure 1:
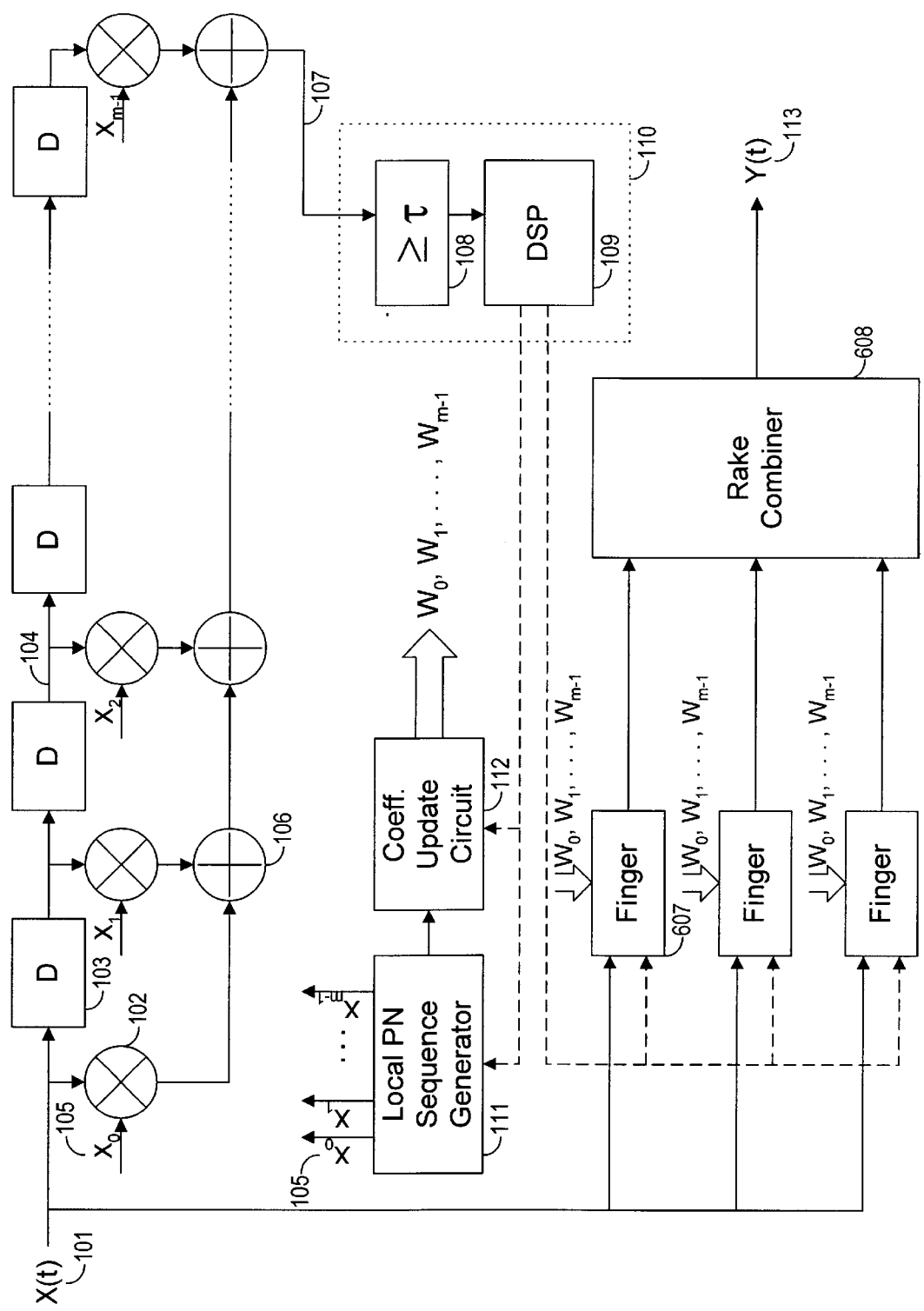
FIG. 1 is a functional block diagram of an embodiment of a spread-spectrum searcher system, implementing a code sequence search technique in accord with the present invention.

FIG. 1 is a functional block diagram useful in understanding the implementation of a partial matched-filter search technique in a spread-spectrum receiver. The searcher begins to search for a multi-path signal when it first receives an input signal 101, applied at the input of the partial matched-filter. The input signal 101 is a spread-spectrum signal, that is to say a content signal spread by means of a predetermined spreading code sequence. The content signal may be a pilot signal, a data signal, or any other type of information signal desired for spread-spectrum transmission. The spreading code sequence of the received input signal 101 can be as long as $2^{15}$ or 32768 chips in an IS-95 based communication system. The spreading code may be of different length if implemented under other standards. The input signal 101 typically contains copies of the same signal at different phases and amplitudes arriving at the receiver via different paths, albeit spread by the same spreading code sequence. Therefore, the spreading code applied at the transmitter will be different from that received at the receiver.

The matched-filter comprises a plurality of multipliers 102. A multi-tap delay line 104, comprising M−1 delay devices 103, receives the input stream X(t) 101. The filter includes multipliers 102 for receiving the chip sequences from the input signal 101 and the taps between the delays 103 of the delay line 104. Coupled to the partial matched-filter is a local a PN sequence generator 111 which generates PN sequence that is ideally similar to the PN sequence generated in the transmitter of the received input signal 101. This generated PN sequence is also referred to as the reference code. Each such multiplier also receives one sample of the reference code sequence generated by the local PN sequence generator 111.

Assume for discussion purposes that the reference code comprises a sequence $X_0 \, X_1 \ldots X_{M-2} X_{M-1}$. Each multiplier 102 therefore receives a portion of reference code sequence $X_0 \, X_1 \ldots X_{M-2} \, X_{M-1}$ for multiplication with the respective delayed portion of the input chip stream X(t) 101.

Assuming that a code chip may have a value of 1 or −1 (corresponding to 0, 1 in binary notation), each multiplication operation will have an output value of 1 if the input value and the reference value are the same (1×or−1×1). Each multiplication operation will have an output value of −1 if the input value and the reference value are different (1×or−1×1). To determine an overall correlation to the complete reference code, an adder circuit 106 sums the outputs of the multipliers. The adder circuit 106 outputs the total correlation value 107, which represents how closely the input stream matched to the reference code. For a perfect match, for example, the output of the adder circuit 107 would be M. If there is no match at all, the output of the adder circuit 107 would be −M. However, in an implementation processing real received spread-spectrum signals, there will be some variable degree of matching.

Coupled to the output 107 of the partial matched-filter is a decision circuit 110 comprising a comparator 108 and a DSP 109. The decision circuit 110 compares the correlation value at the output 107 of the adder circuit 106 to the threshold $\tau$. Essentially, once the correlation value meets or exceeds the threshold, the coefficient update circuit 112 downloads the reference code to one of the plurality of tracking fingers 607 as instructed by the DSP 109. A coefficient update circuit 112 maintains the reference code for downloading to the fingers 607. The coefficient update circuit functions as a phase shifter for an identified PN sequence. Once a PN sequence is found for one of the path signals, any amount of phase shift can be adjusted to it, so that a finger 607 can readily use the identified code sequence to track the targeted PN sequence.

Upon receipt of an identified code sequence, a finger 607 correlates the received signal 101 with the downloaded reference code sequence, to thereby track the respective multi-path signal. In addition, the DSP 109 instructs the local PN sequence generator 111 to hold the code sequence relative to the received signal for either one half-chip or a predetermined number of chips and then keeps it frozen for searching other significant multi-path signals. The procedure of matching the reference code with the input signal 101 producing a new correlation value repeats for detecting each subsequent multi-path signal. Each detected multi-path signal is tracked by an individual finger 607. All the tracked multi-path signals are then combined by a Rake combiner 608. The connections of the DSP 109, local PN sequence generator 111, fingers 607, and Rake combiner 608 in FIG. 1 are discussed in greater detail with respect to a later embodiment.

While the partial matched-filter searcher system does reduce hardware complexity with its shorter tap delay line, there are other embodiments offering the same hardware complexity with greater reliability in detecting multi-path signals.

Figure 2:
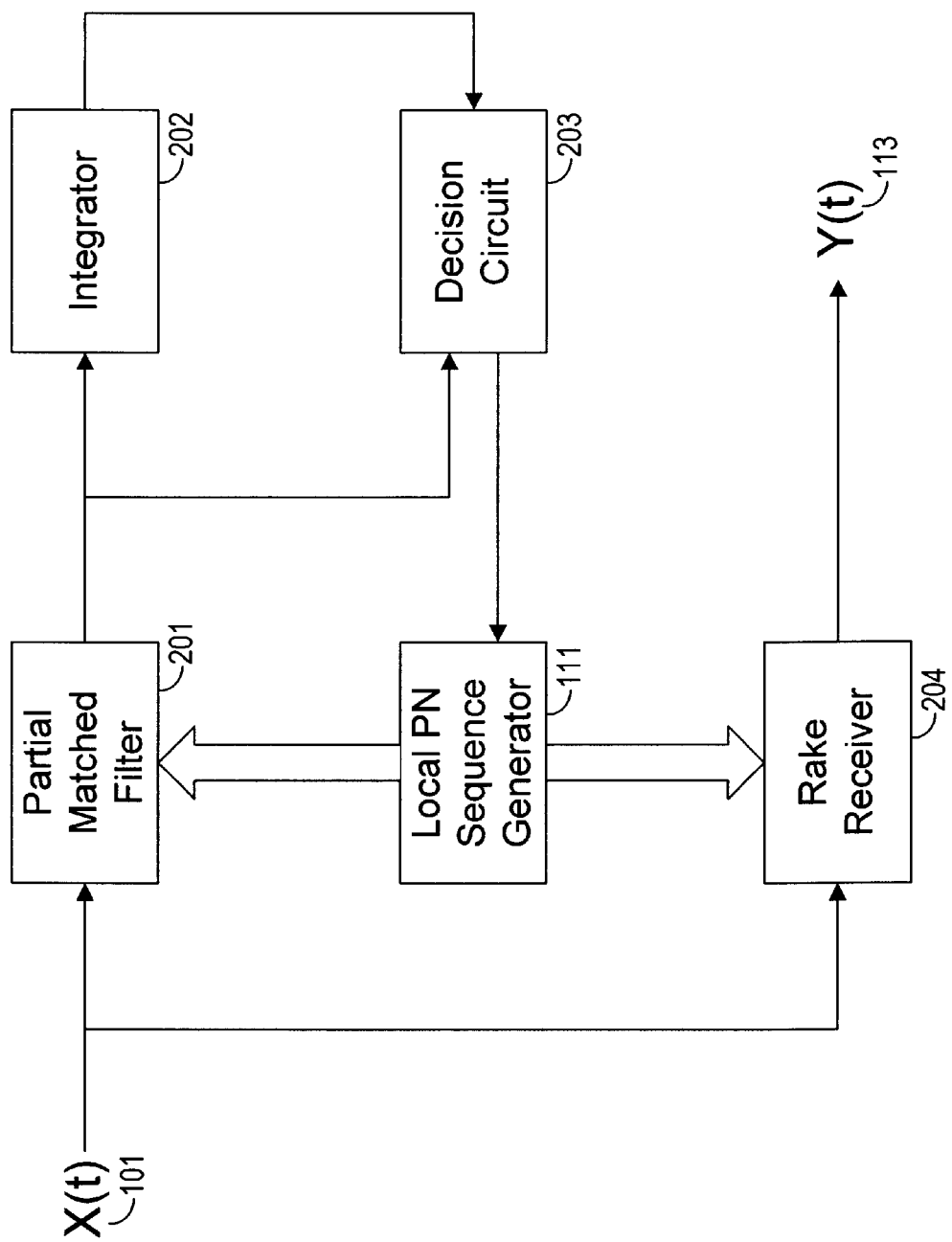
FIG. 2 is a block diagram of the presently preferred embodiment of a spread-spectrum searcher system, implementing a code sequence search technique in accord with the present invention.

FIG. 2 shows the preferred embodiment of a sliding partial matched-filter searcher, for finding a spread-spectrum signal in a multi-path propagation environments, particularly for application to fourth generation wireless communication systems. The elements of the searcher comprise a partial matched-filter 201 similar to the filter discussed with regards to FIG. 1, an integrator 202, and a decision circuit 203. The local PN sequence generator 111 is usually part of the partial matched-filter 201 but may be implemented independent of the partial matched-filter 201. A rake receiver 204 is coupled to the searcher for processing and combining the detected multi-path signals.

After partially matching the input signal 101 with a reference code generated by a local PN sequence generator 111 as discussed with regards to FIG. 1, the partial matched-filter 201 outputs a first correlation value. The integrator 202 receives the first correlation value and outputs a second correlation value. During this time, the decision circuit 203 compares the first and second correlation values with first and second thresholds. Upon the identification of a positive search result, the decision circuit 203 instructs the local PN sequence generator 111 to download the reference code corresponding to the detected multi-path signal to the Rake receiver 204. The Rake receiver 204 tracks individual multi-path from the input signal 101, and coherently combining them as the total signal, Y(t) 113. This procedure repeats until the searcher detects all significant multi-path signals.

Figure 3:
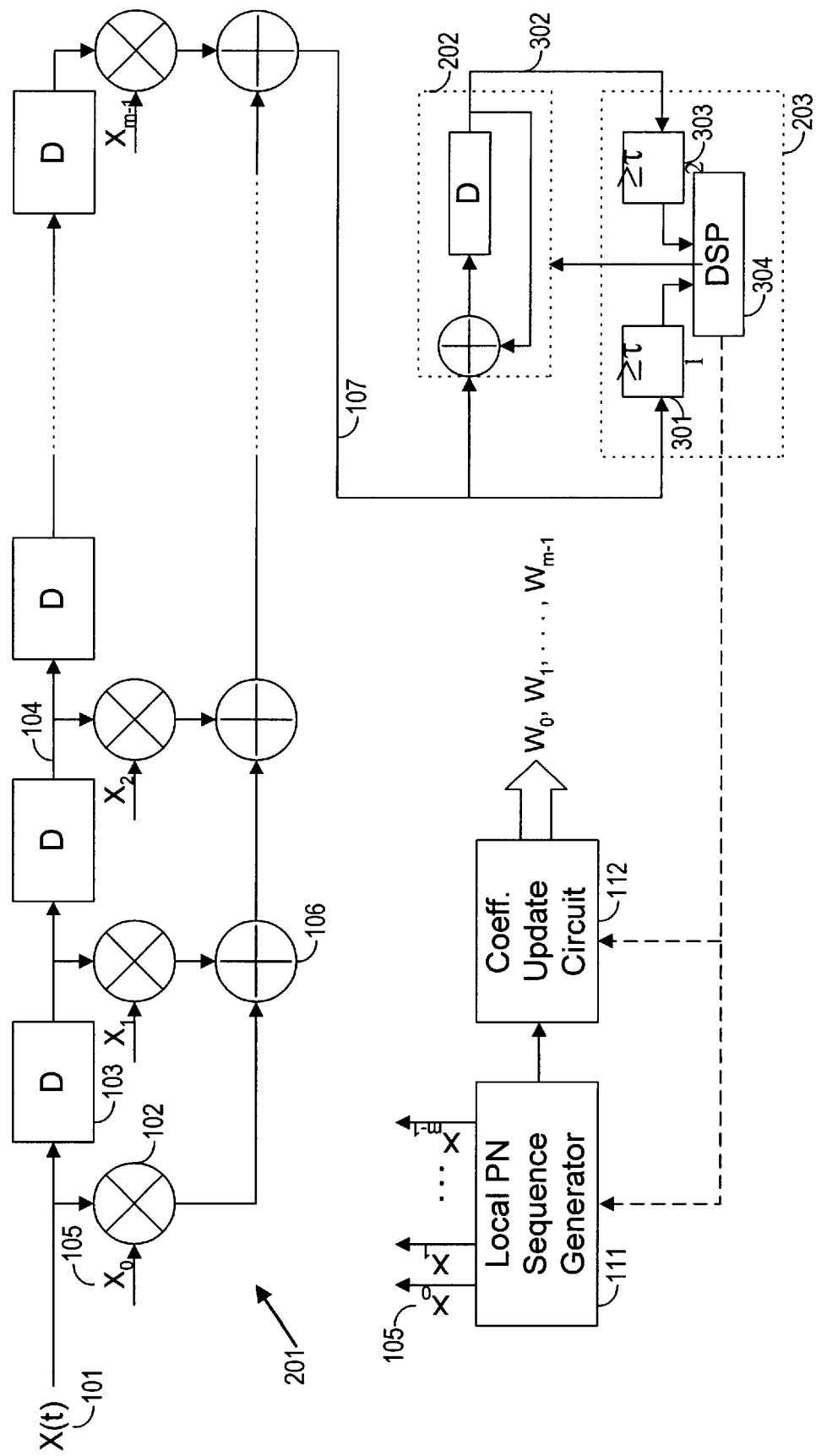
FIG. 3 is a functional block diagram of the preferred embodiment of the spread-spectrum searcher, implementing the code sequence search technique in accord with the present invention.

FIG. 3 is a functional block diagram useful in understanding the implementation of the inventive searcher. Here, the partial matched-filter 201 comprises a plurality of multipliers 102, receiving the chip sequences from the input signal 101 and the taps between delays 103 of the line 104. The multipliers 102 also receive the chips of a window of the reference code sequence from the local PN sequence generator 111. The sliding-window operation with respect to the reference code is described in greater detail below. An adder circuit 106, comprising a series of adders, sums the outputs of the multipliers 102 and outputs a first correlation value 107. The value at the output 107 of the partial matched-filter 201 represents how closely the current set of samples of the input chip stream matched the current segment of the reference code, that is to say matched over the period of the window. For a perfect partial match, for example, the first correlation value would be equal to the width of the window, +m. If there is no match at all, the first correlation value at 107 would −m. However, in an implementation processing real received spread-spectrum signals, there will be some variable degree of matching over the window resulting in a value at output 107 that is somewhere between +m and −m.

Coupled to the output 107 of the adder circuit 106, i.e. the partial matched-filter 201, are a first comparator 301 and an integrator 202. Coupled to the output 302 of the integrator 202 is a second comparator 303. Coupled to the first comparator 301, the second comparator 303, the integrator 202, and the local PN sequence generator 111 is a DSP 304. The decision circuit 203 represents the combination of the first and second comparator 301, 303 and the DSP 304. Threshold detectors, as illustrated, may be utilized to detect when a correlation value equals or exceeds a threshold $\tau_1, \tau_2$ whereby the DSP 304 receives a signal once the thresholds $\tau_1, \tau_2$ are met. However, other means known by one of ordinary skill in the art may be used to monitor the thresholds. This may include using a processor or algorithm implemented in the DSP 304 to monitor the correlation values and thresholds. Furthermore, the thresholds can be adjusted to suit each individual operating environment.

The DSP 304 controls each of the elements to which it connects. For example, when the first correlation value equals or exceeds the first threshold $\tau_1$, the DSP 304 instructs the integrator 202 to integrate the first correlation value over a predetermined amount of chips, which depends on the desired length of time to integrate. Once the integrator outputs a second correlation value at the output 302, the decision circuit 304 compares the second correlation value with the second threshold $\tau_2$. The second correlation value equaling or exceeding the second threshold $\tau_2$ signifies the detection of a multi-path signal. Therefore, the DSP 304 sends a control signal to the local PN generator 111 and the coefficient update circuit 112. If the first correlation value does not equal or exceed the first threshold $\tau_1$, the DSP 304 will not instruct the integrator 202 to start, and the matching process continues. The above steps are discussed in greater detail below.

Figure 4:
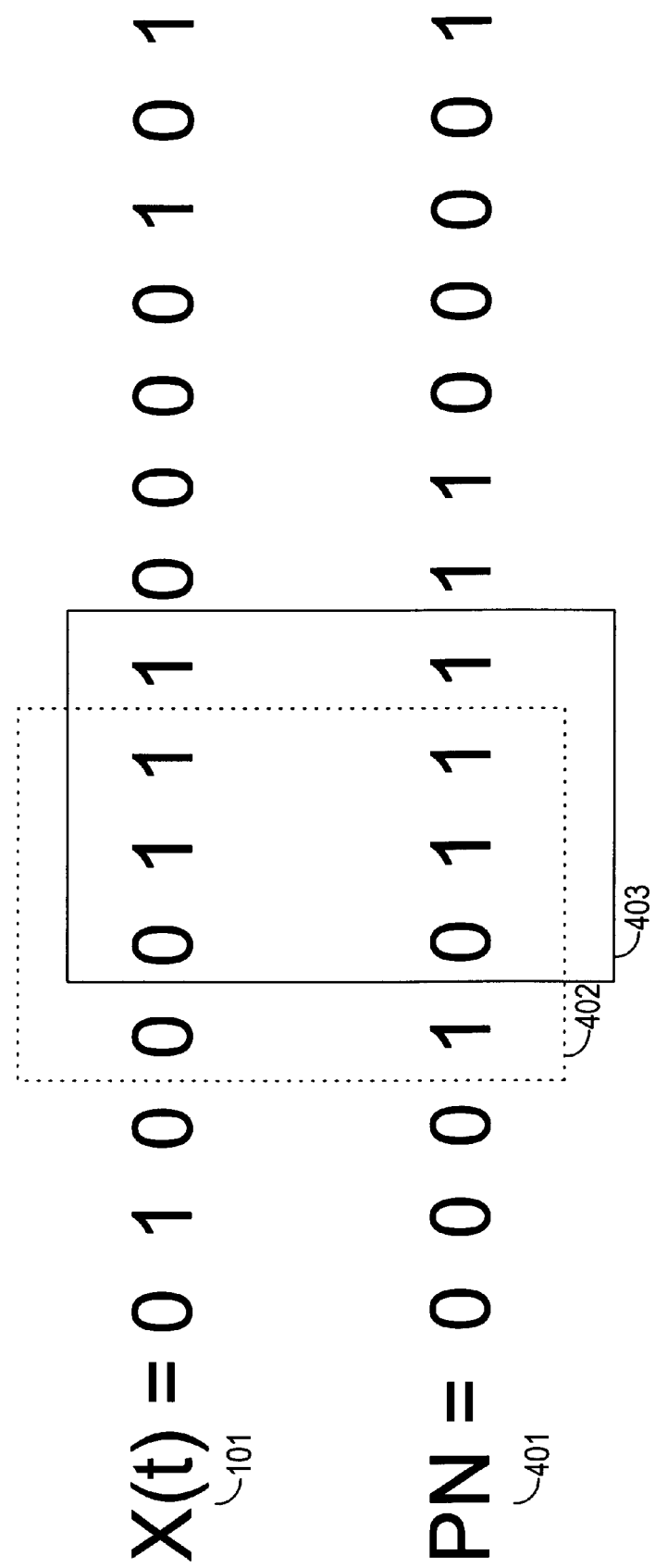
FIG. 4 depicts application of an example of the sliding matched-filter technique in accord with the present invention to an input signal and a reference code.

FIG. 4 shows the windowing of the PN sequence employed by the present invention. Refer to FIGS. 3 & 4 for the subsequent explanation.

Referring to FIG. 4, in order to detect each multi-path signal, the inventive searcher compares a window 402, 403 of the generated reference code 401 with the input signal 101. The width of the window 402, 403 is smaller than that used in the IS-95 communication system or other standards. The width may be of different widths depending on desired specifications. A typical value M of the window size of the partial matched-filter is from 16 to 64 chips. A small window size reduces the necessary length of the tap delay line 10 and the quantities of other circuitry in the partial matched-filter thereby providing faster correlation and processing times with less hardware. A window width of 4 is shown for ease of explanation.

When the searcher receives the input signal 101, the searcher locks onto a portion of the input signal 101 represented by window 402. Additionally, the local PN Generator 111 supplies a portion of the reference code 401 represented by the window 402 to the partial matched-filter in order to match the two sequences. Output of the partial matched-filter 201 is a correlation value. In the example, the value over the first window position 402 would represent a correspondence at three of the four positions within the window. If this correlation value equals or exceeds the first threshold $\tau_1$, integration commences and the reference code and the input signal shift at the same speed to a new position 403. Again, the searcher matches the new portion of the reference code 401 with the new portion of the input signal 101 represented by position 403 producing a new correlation value. In the illustrated example, this new correlation value represents a match at all four of the positions within the window. If the first threshold is again met, integration commences essentially summing the two correlation values. The procedure of shifting repeats until the second correlation value meets or exceeds the second threshold $\tau_2$, which represents the detection of a multi-path signal.

Returning to FIG. 3, the number of tap delay elements 103 depends on the width of the window 402, 403 and the desired resolution. For example, a width of 16 with the resolution of half-chip requires 31 tap delay elements 103 in the partial matched-filter 201. However, differing widths or resolutions may increase or decrease the number of tap delay elements 103. Different window sizes and resolutions may be chosen depending on the desired specifications.

As the searcher receives the input signal, each tap delay element 103 outputs a sample of the input signal 101 for each respective time period, and each multiplier 102 receives a respective sample. After the local PN sequence generator 111 generates a reference code 401, each multiplier 102 receives a chip of the window 402 of the reference code 401, respectively.

Accordingly, the partial matched-filter correlates each chip of the window 402 of the reference code 401 with each respective sample of a segment of the input signal 101 that is equal in width to the width of the window. The adder circuit 106 receives the output of the multipliers 102 for summing the products of each multiplier 102. The output 107 of the adder circuit 106 represents a first correlation value. The first correlation value of window 402 equals 2, in the illustrated example.

The correlation values vary with respect to whether the reference code matched the input signal 101. Assume for discussion purposes that the window portion of the reference code comprises a sequence $X_0\ X_1 \ldots X_{m-2}\ X_{m-1}$. Each multiplier therefore receives a portion of the reference code sequence $X_0\ X_1 \ldots X_{m-2}\ X_{m-1}$ for multiplication with the respective delayed portion of the input chip stream 101.

Assuming that a reference code chip may have a value of 1 or −1 (corresponding to 0, 1 in binary notation), each multiplication operation will have an output value of 1 if the input value and the reference value are the same (1×1×1 or −1×1). Each multiplication operation will have an output value of −1 if the input value and the reference value are different (1×−1 or −1×1). To determine an overall correlation to the complete reference code, the adder circuit 106 sums the outputs of the multipliers. The adder circuit 106 outputs the first correlation value, which represents how closely the input chip stream 101 matched the reference code 401. For a perfect match, for example, the output 107 of the adder circuit 106 would be m. If there is no match at all, the output 107 of the adder circuit 106 would be −m. However, in an implementation processing real received spread-spectrum signals, there will be some variable degree of matching.

Next, the decision circuit 203 comprising the DSP 304 and the first and second threshold comparators 301 and 302, compares the first correlation value with the first threshold $\tau_1$. If the first correlation value does not equal or exceed the first threshold $\tau_1$, the DSP 304 will not send a control signal via the control line coupled to the integrator 202, and therefore, the integrator 202 is not activated. Hence, the first correlation value passes through the integrator 202 with no integration. The matching of the reference code 401 with the samples of the input signal 101 continues until the first correlation value equals or exceeds the first threshold $\tau_1$. During this time, the searcher functions as a matched-filter and the reference code remains fixed.

The integrator 202 starts only when the first correlation value equals or exceeds the first threshold $\tau_1$, indicating a sufficient degree of matching to the fixed portion of the reference code. Once met, the DSP 304 sends a control signal instructing the integrator 202 to begin integration. Therefore, if the first correlation value equals or exceeds the first threshold, integration commences. The time of integration is dependent on the system design. The longer time of integration increases the probability of detecting a multi-path signal.

In addition to starting the integrator, the DSP 304 sends a control signal to the local PN sequence generator 111 instructing it to move the reference code sequence, that is to say to allow the generator to run at the same speed and in the same logical direction as the input signal. As the PN sequence and the input run, the integrator integrates the matching level signal, output from the partial matched-filter 201, over time. The integration, in turn represents an overall correlation. In the exemplary searching process, the window 402 shifts to a new position 403, preferably by one chip at every clock signal. The partial matched-filter 201 produces a new first correlation value. The new value is added to the previous total, as part of the integration. When the second integration value equals or exceeds the second threshold $\tau_2$, it signifies the detection of a multi-path signal of the probability as set by the system designer. This technique allows the present invention to realize the benefits of a matched-filter until the first threshold $\tau_1$ is met and realize the benefits of a correlator after the first threshold $\tau_1$ is met and until the second $\tau_2$ is met.

Once a second threshold $\tau_2$ is met, the integration stops and the DSP 304 sends a control signal to the local PN sequence generator 111 instructing it to download the reference code 401 corresponding to the detected multi-path signal to one of the fingers 607 for tracking.

After the detection of a multi-path signal or in case of failing to detect a multi-path signal when threshold $\tau_2$ is not met over an extended time period, the inventive searcher continues to detect other significant multi-path signals by freezing the local PN sequence generator either for one half-chip of a predetermined number of chips relative to the received spread-spectrum signal. The DSP 304 will instruct the integrator circuit to reset to 0, and the procedure of matching the frozen reference code sequence with the received signal continues as the searcher continues to receive the input signal over time.

The use of the two thresholds $\tau_1$, $\tau_2$ allows the present invention to be quite flexible. Two thresholds allow significantly more flexibility because the first threshold $\tau_1$ may be set lower than that traditionally set in a matched-filter with one threshold. This can lessen the time to meet a certain threshold for detecting a multi-path signal. The first threshold $\tau_1$ may be optimized to detect a multi-path signal in close proximity instead of high probability characteristic of the prior art. This ensures that when the second threshold $\tau_2$ is met, the probability of a detected multi-path signal is very high.

The inventive searcher essentially combines a partial matched-filter and a correlator into a single entity. The short tap length reduces the amount of hardware required for the searcher, and it can be made programmable depending on the probability of detection. The longer the tap delay line, the smaller the probability of false detection. However, the integrator can compensate for that by integrating over a longer time period to improve the probability of correctly detecting a multi-path signal.

Figure 5:
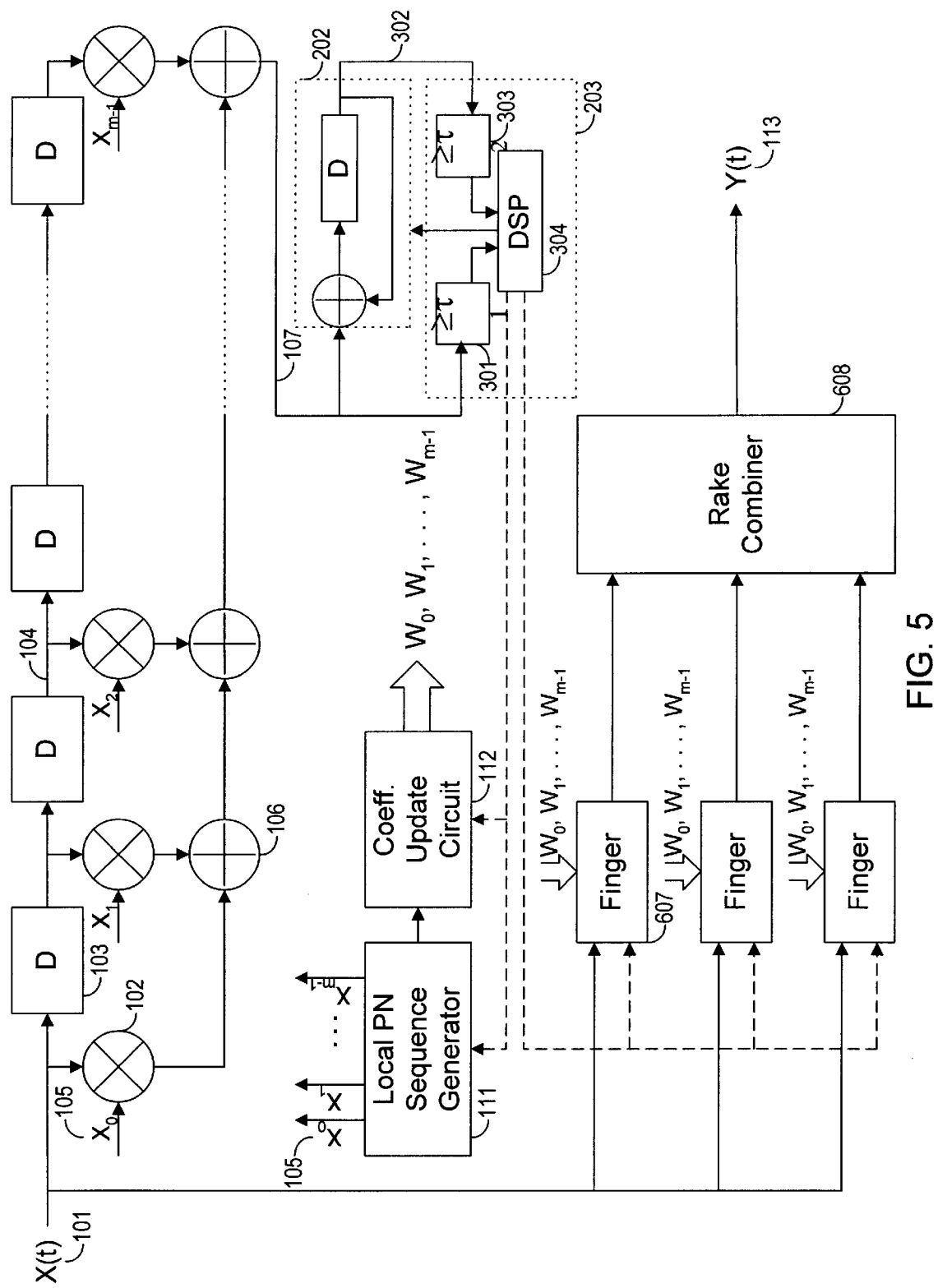
FIG. 5 is a functional block diagram of the preferred embodiment of the spread-spectrum sliding matched-filter system, implementing the code sequence search technique and a Rake combiner in accord with the present invention.
Figure 6:
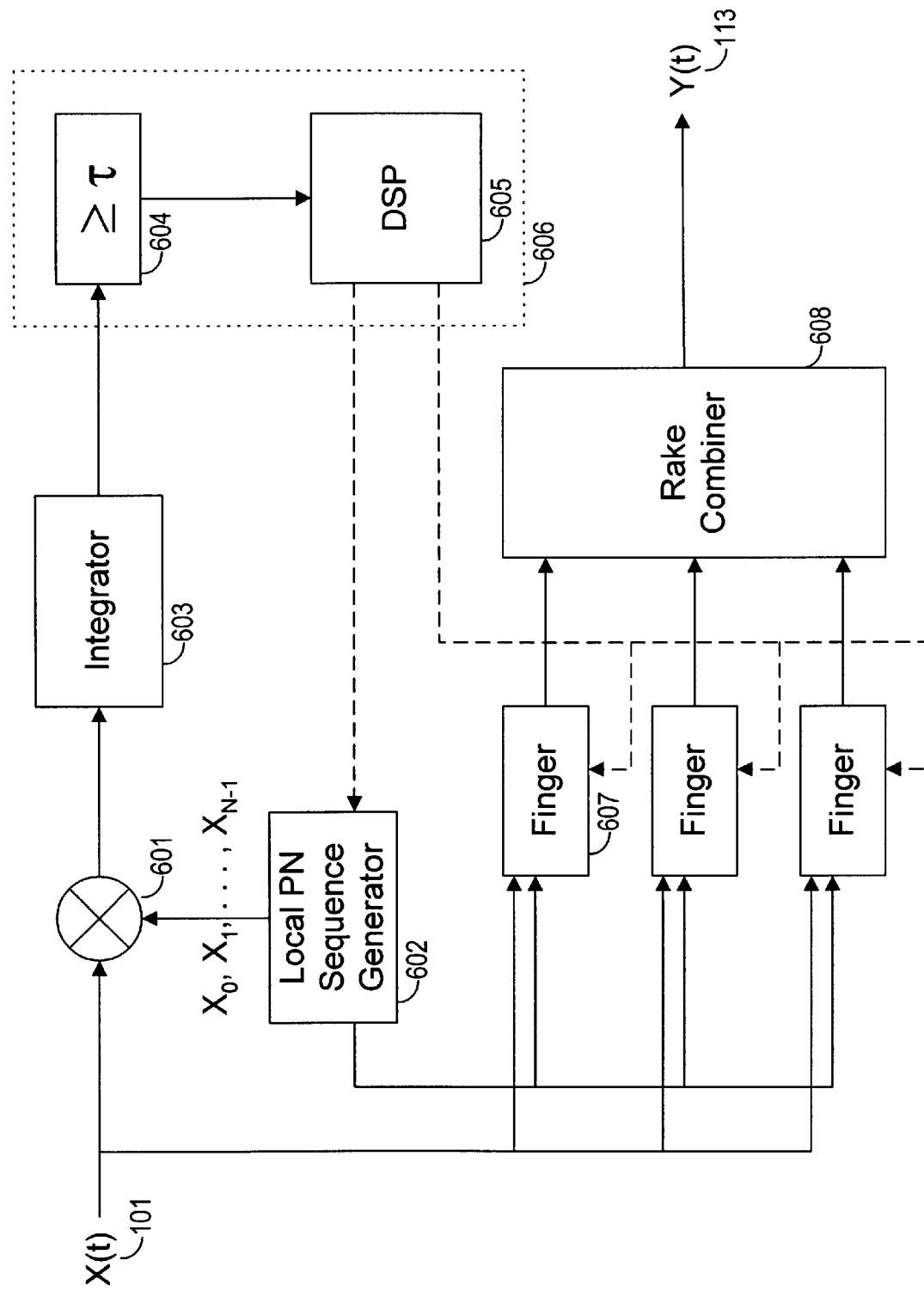
FIG. 6 is a block diagram of a prior art correlator for detecting received spread-spectrum signal.

FIG. 5 shows the spread-spectrum sliding matched-filter searcher discussed above together with a Rake receiver system, which comprises a plurality of fingers 607 and a Rake combiner 608. The finger 607 is a tracking device responsible for aligning the reference code 401 corresponding to a detected multi-path signal with the respective multi-path signal in finer steps. Coupled to each of the fingers 607 are the input signal 101, the local PN sequence generator 111, the DSP 304, and a Rake combiner 608. After the identification of a positive search result based on the second threshold $\tau_2$, the DSP 304 sends a control signal to the local PN sequence generator 111 instructing it to download the reference code 401 to one of the plurality of fingers 607.

The DSP 304 also sends a control signal to one of the plurality of fingers 607 instructing it to intercept the reference code sent by the local PN generator 111. Accordingly, once the local PN sequence generator 111 sends the reference code 401, a finger 607 receives it. The finger 607 uses the received version of the reference code to fine-tune the one detected multi-path signal. The process repeats until each finger 607 is tracking one multi-path signal. This is one method allowing the DSP 304 to determine when all significant signals have been found by monitoring the plurality of fingers 607.

The reference code for each positive search result is likely to differ in phase, thereby each representing a specific path of the multi-path signal. Therefore, for multiple positive search results, each finger 607 may have a different portion of the reference code at any given time, representing a specific path. Once each finger 607 tracks a respected signal or the DSP 304 determines that all significant signals have been found, the outputs of the fingers 607 are applied to a Rake combiner 608. The Rake combiner 608 combines the multiple multi-path signals into one single signal thereby conserving energy and producing a total output signal 113 with little energy loss.

While the foregoing has described what are considered to be the best mode and/or other preferred embodiments of the invention, it is understood that various modifications may be made therein and that the invention may be implemented in various forms and embodiments, and that it may be applied in numerous applications, only some of which have been described herein. It is intended by the following claims to claim any and all modifications and variations that fall within the true scope of the invention.

What is claimed is:

1. A spread-spectrum sliding matched-filter searcher system, for finding multi-path signals from a received spread-spectrum signal, comprising:

a partial matched filter for receiving an input of a spread-spectrum signal having a spreading code sequence and an information signal, for matching a portion of the input signal during each plurality of time periods to a portion of a reference code sequence and for generating a first correlation value responsive to the matching during each of the time periods;

an integrator coupled to the partial matched-filter for integrating the first correlation value over said time periods to generate a second correlation value; and a decision circuit for comparing a first and a second correlation value with a first threshold and a second threshold, respectively, to determine if the received spread-spectrum signal adequately matches the reference code.

2. The spread-spectrum sliding matched-filter searcher system as in claim 1, wherein the portion of the reference code remains fixed relative to the received spread-spectrum signal until the first correlation value equals or exceeds the first threshold.

3. The spread-spectrum sliding matched filter searcher system as in claim 2, wherein after a predetermined number of chips, the local PN reference code sequence freezes, and the integrator resets to zero when either the second correlation value equals or exceeds the second threshold or the second correlation value does not equal or exceed the second threshold over a predetermined extended time period.

4. The spread-spectrum sliding matched-filter searcher system as in claim 1, wherein the partial matched filter comprises a tap delay line having a length smaller than a full matched filter length.

5. The spread-spectrum filter searcher system as in claim 1, wherein the decision circuit controls the integration based on the first threshold to trigger the execution of the integrator and identifies a positive search result based on the second threshold.

6. The spread-spectrum sliding matched-filter searcher system as in claim 1, further comprising:

a local pseudo random (PN) sequence generator coupled to the matched-filter for generating the reference code sequence.

7. A spread-spectrum searcher and receiver system, comprising:

a correlator, comprising:

(a) a partial matched-filter for receiving an input of a spread-spectrum signal having a spreading code sequence and an information signal, for matching the input signal over a plurality of chips to a portion of a reference code sequence and for generating a first correlation value representative of the matching of the input signal to the portion of the reference code sequence, (b) an integrator coupled to the partial matched-filter for integrating the first correlation value over a predetermined number of time periods as the reference code and the received signal move at the same speed and the same logical direction, to generate a second correlation value, and (c) a decision circuit for comparing the first and the second correlation values with first and second threshold values, wherein the integration commences when the first correlation value equals or exceeds the first threshold and the second correlation value does not equal or exceed the second threshold; and at least one finger for receiving the reference code representing a phase of the input signal corresponding to a detected multi-path signal when the second correlation value equals or exceeds the second threshold identifying a positive search result.

8. The spread-spectrum filter searcher and receiver system as in claim 7, further comprising:

a local pseudo random (PN) sequence generator for generating the reference code sequence.

9. The spread-spectrum filter searcher and receiver system as in claim 7, wherein the partial matched-filter comprises a tap delay line having a length smaller than a full matched filter length.

10. The spread-spectrum filter searcher and receiver system as in claim 7, wherein the local reference code freezes and the integrator resets to zero after a predetermined number of chips when the second correlation value equals or exceeds the second threshold or the second correlation value does not equal or exceeds the second threshold over an extended time period.

11. The spread-spectrum filter searcher and receiver system as in claim 7, wherein the at least one finger comprises a plurality of fingers for correlating input signal with the received reference code each representative of a detected multi-path signal at a plurality of particular phases producing the multi-path signals.

12. The spread-spectrum filter searcher and receiver system as in claim 11, further comprising a Rake combiner for receiving and combining the outputs of the plurality of fingers.

13. A spread-spectrum sliding matched-filter searcher system, for finding a spreading code sequence in a multi-path signal from a received spread-spectrum signal, comprising:

a pseudo random (PN) sequence generator for generating a reference code sequence identical to a spreading code sequence potentially contained in a received spread-spectrum signal;

na partial matched filter comprising:
(a) a plurality of tap delay elements, each tap delay element for providing a delay of one time period and outputting one sample of the input signal,
(b) a plurality of multipliers wherein the first multiplier receives the input signal and one chip of the reference code further wherein each subsequent multiplier receives an output of a tap delay element and one respective chip of the reference code, and
(c) an adder circuit for summing the outputs of each multiplier producing a first correlation value;

an integrator receiving the first correlation value for integrating the first correlation value over a plurality of time periods when the first correlation equals or exceeds a first threshold, to generate a second correlation value; and a decision circuit for comparing the second correlation value with a second threshold and generating a positive search result if the second correlation value equals or exceeds the second threshold.

14. The spread-spectrum sliding matched-filter searcher system as in claim 13, wherein the reference code sequence moves at the same speed and in the same logical direction as the received spread-spectrum signal when the second correlation value does not equal or exceed the respective threshold to facilitate the integration.

15. The spread-spectrum filter searcher system as in claim 13, wherein the partial matched filter comprises a tap delay line having a length smaller than that a full matched filter length.

16. A method for finding a multi-path signal from a received spread-spectrum signal, comprising:

(a) receiving an input multipath signal comprising a spread spectrum signal having a spreading code sequence and an information signal;

(b) matched-filtering a predetermined number of samples of the input signal with a window of a reference code producing a first correlation value;

(c) comparing the first correlation value to a first threshold;

(d) when the first correlation value equals or exceeds the first threshold, integrating the first correlation value over time equal to the size of the window to produce a second correlation value;

(e) comparing the second correlation value with a second threshold; and (f) indicating a detection of a multi-path signal when the second correlation value equals or exceeds the second threshold.

17. The method of claim 16, wherein the partial matched-filtering step comprises:

(b)(1) generating a local reference code sequence signal;

(b)(2) applying the input signal to a plurality of tap delays elements;

(b)(3) multiplying a current value of the input signal and each output of the tap delay elements by at least one respective chip of the reference code, respectively; and (b)(4) summing the products of step (b)(3) to produce the first correlation signal.

18. The method of claim 17, wherein the integration comprises:

(d)(1) freezing the reference code;

(d)(2) receiving new samples of the input signal;

(d)(3) matching the product of step (d)(1) and (d)(2) to produce a new first correlation value;

(d)(4) moving the reference code and the input signal and integrating the new first correlation value over time equal to the predetermined time period to produce a second correlation value; and (d)(5) repeating steps (d)(1)–(d)(4) by freezing the local PN sequence generator and resetting the integration to zero, after a predetermined number of chips when either the second correlation value meets the second threshold or the second correlation value does not meet the second threshold over an extended time period.

* * * * *